April 23, 1940. W. S. HEFFERNAN 2,198,533
DEVICE FOR BOILING LIQUIDS WITHOUT OVERFLOW
Filed Nov. 17, 1938
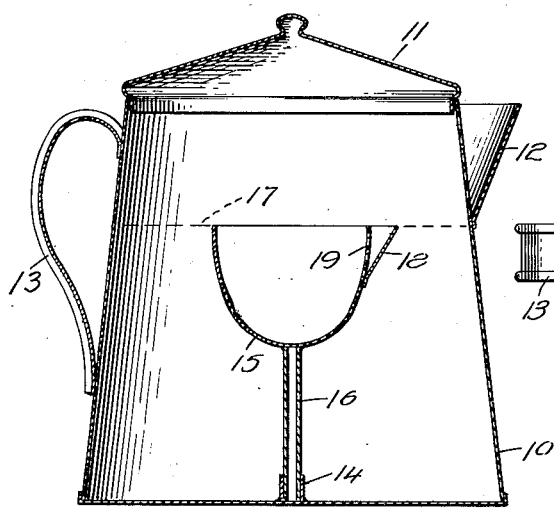
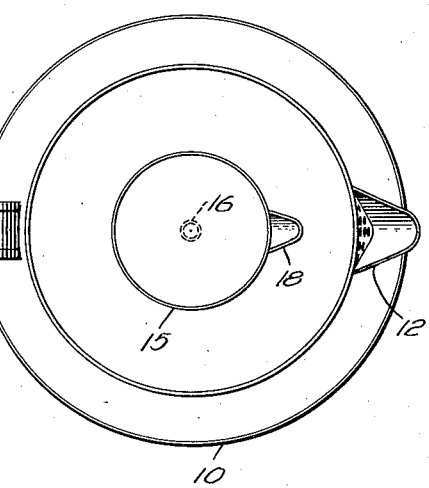
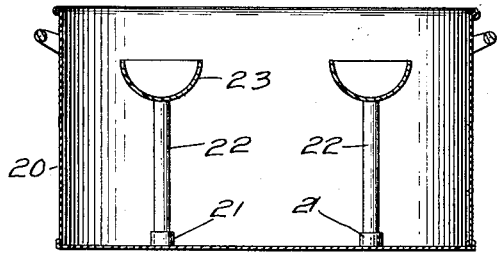
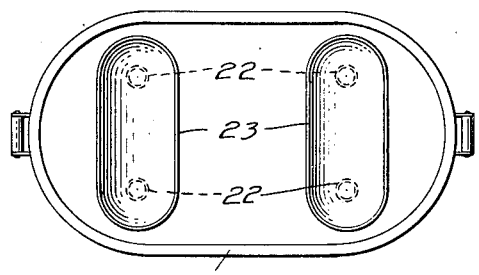
Winfield S. Heffernan, INVENTOR
BY Victor J. Evans & Co.
ATTORNEYS Patented Apr. 23, 1940

2,198,533

UNITED STATES PATENT OFFICE 2,198,533

DEVICE FOR BOILING LIQUIDS WITHOUT OVERFLOW

Winfield S. Heffernan, Duluth, Minn.

Application November 17, 1938, Serial No. 241,036

2 Claims. (Cl. 53—1)

This invention relates to devices for boiling liquids without overflow and has for an object to provide a utensil having a container within the utensil and opening upwardly at the liquid level to receive overflow of boiling liquid.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a coffee pot equipped with a device for preventing overflow, constructed in accordance with the invention.

Figure 2 is a plan view of the coffee pot shown in Figure 1 with the lid removed and showing the overflow container in top plan.

Figure 3 is a longitudinal sectional view of a boiler equipped with removable overflow devices, constructed in accordance with the invention.

Figure 4 is a top plan view of the boiler shown in Figure 3.

Referring now to the drawing in which like characters of reference designate similar parts in the various views, 10 designates a coffee pot having a lid 11, a spout 12 and a handle 13, these parts being conventional.

In carrying out the invention a tubular socket member 14 is secured in any preferred manner to the top face of the bottom of the pot, at the center thereof. A cup shaped overflow device 15 is provided with a stem 16 extending downwardly from the center of the bottom thereof which is removably received in the socket member 14. The overflow cup extends upwardly the liquid level 17 of the pot and opens at the liquid level. A pouring spout 18 is arranged on the wall of the cup and the wall of the cup at the spout is perforated as shown at 19.

When the liquid begins to boil in the pot the overflow will boil into the overflow cup 15 and will not boil out of the pot. When the pot is poured the liquid in the cup will be poured therefrom since the spout 18 is disposed on the same side of the wall of the overflow cup as the spout 12 on the pot 10.

A modified form of the invention is shown in Figure 3 in which a boiler 20 of conventional type is provided in the bottom with a pair of tubular socket members 21 which receive the stems 22 of overflow cups 23 of the same type as the overflow cup previously described except that these cups are elongated transversely of the boiler as best shown in Fig. 5, and extend to nearly the side walls of the boiler, as shown in Figure 5.

In all forms of the invention when the liquid begins to boil the overflow escapes into the overflow cups and is retained therein instead of overflowing to the exterior of the utensil.

From the above description it is thought that the construction and operation of the invention will be fully understood without further explanation.

What is claimed is:

1. A device for boiling liquids without overflow comprising the combination with an utensil for boiling liquids, of a stem extending upwardly from the bottom of the utensil, a container on the top of the stem, the container being spaced from the bottom, top and sides of the utensil and being fully opened at the top, the bottom and sides of the container being imperforate, the utensil being adapted to be supplied with liquid until the liquid reaches the upper edge of the container, liquid in the utensil, when boiling, flowing into the container instead of over the edge of the utensil.

2. A device for boiling liquids without overflow comprising the combination with an utensil for boiling liquids, of a socket on the bottom of the utensil, a stem extending vertically in the socket, an open top container mounted on the top of the stem and spaced from the bottom, top and sides of the utensil, the container being fully opened at the upper side, the bottom and lateral sides of the container being imperforate, said container being initially empty in practice and adapted to receive the overflow of liquid when boiled in the utensil.

WINFIELD S. HEFFERNAN.